US012305595B1

(12) United States Patent
Homison

(10) Patent No.: US 12,305,595 B1
(45) Date of Patent: May 20, 2025

(54) METHOD AND SYSTEM FOR FUEL CONDITIONING

(71) Applicant: Transportation IP Holdings, LLC, Norwalk, CT (US)

(72) Inventor: Christopher Joseph Homison, Wattsburg, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 0 days.

(21) Appl. No.: 18/777,210

(22) Filed: Jul. 18, 2024

(51) Int. Cl.
*F02M 31/16* (2006.01)
*F01N 5/02* (2006.01)
*F02B 37/10* (2006.01)

(52) U.S. Cl.
CPC ............... *F02M 31/16* (2013.01); *F01N 5/02* (2013.01); *F02B 37/10* (2013.01)

(58) Field of Classification Search
CPC .................................. F02B 37/10; F01N 5/02
See application file for complete search history.

(56) References Cited

U.S. PATENT DOCUMENTS

2018/0334927 A1* 11/2018 Löytty .................. F02B 37/004

FOREIGN PATENT DOCUMENTS

EP 3957838 A1 * 2/2022 ........... F01N 3/0205
GB 2561532 A * 10/2018 .............. F02B 39/10
WO WO-2018138314 A1 * 8/2018 .............. F01N 11/00

OTHER PUBLICATIONS

Kennedy et al., Inverted Brayton Cycle With Exhaust Gas Condensation, Journal of Engineering for Gas Turbines and Power (Nov. 2018), 140:111702-1-111702-11.

* cited by examiner

*Primary Examiner* — Ngoc T Nguyen
(74) *Attorney, Agent, or Firm* — K&L Gates LLP

(57) ABSTRACT

A system comprising a turbine assembly, a heat exchanger, and a compressor assembly is disclosed. The turbine assembly comprises a turbine housing configured to accept an exhaust stream generated by a fuel convertor and a turbine rotor configured to extract a driving energy from the exhaust stream based on an expansion of the exhaust stream through the turbine assembly. The heat exchanger comprises a first flow channel for accepting the exhaust stream from the turbine assembly, a second flow channel in thermal communication with the first channel for flowing a fuel for the fuel converter, and a third flow channel in fluid communication with the first flow channel. The compressor assembly comprises a compressor housing for accepting the exhaust stream from the first flow channel and a compressor rotor operable by the driving energy. A method and an energy recovery system are also disclosed.

20 Claims, 2 Drawing Sheets

METHOD AND SYSTEM FOR FUEL CONDITIONING

BACKGROUND

Technical Field

The subject matter described herein relates to systems and methods for conditioning fuel.

Discussion of Art

Fuel converters may produce useful work from chemical energy contained in fuels, some of which may require special storage conditions. For example, hydrogen and/or natural gas based fuel may be stored at low or cryogenic temperatures as liquids or as compressed gases. However, the storage condition of fuel may require further energy intensive preparation prior to being consumed by a fuel converter. Thus, it may be desirable to have fuel converters which are more thermally and/or energy efficient.

BRIEF DESCRIPTION

In one embodiment, a method includes receiving an exhaust stream from a fuel converter at a first pressure via a first flow path, expanding the exhaust stream to a second pressure that is lower than the first pressure, and receiving the exhaust stream at the second pressure into a heat exchanger via the first flow path. The method further includes receiving a fuel stream into the heat exchanger via a second flow path, transferring thermal energy between the exhaust stream and the fuel to condition the fuel stream, and evacuating a vapor-rich fraction of the exhaust stream from the first flow path. In this embodiment, the first flow path is fluidically isolated from the second flow path. Further, the exhaust stream within the heat exchanger includes the vapor-rich fraction and a liquid-rich fraction, and a pressure of the vapor-rich fraction evacuated from the first flow path is greater than the second pressure.

In one embodiment, a system includes a turbine assembly, a heat exchanger, and a compressor assembly. The turbine assembly includes a turbine housing that accepts an exhaust stream generated by a fuel convertor and a turbine rotor that extracts a driving energy from the exhaust stream based on an expansion of the exhaust stream through the turbine assembly. The heat exchanger includes a first flow channel for accepting the exhaust stream from the turbine assembly, a second flow channel for flowing a fuel for the fuel converter, and a third flow channel in fluid communication with the first flow channel. The second flow channel is in thermal communication with the first flow channel and the third flow channel accumulates a condensable component of the exhaust stream. The compressor assembly includes a compressor housing for accepting the exhaust stream from the first flow channel and a compressor rotor operable by the driving energy.

In one embodiment, an energy recovery system for a fuel converter includes a turbine that expands an exhaust stream of the fuel converter from a first pressure to a second pressure, a compressor for evacuating the exhaust stream at the second pressure from the energy recovery system, and a heat exchanger assembly for transferring thermal energy from the exhaust stream at the second pressure to a fuel for the fuel converter. The compressor and the turbine operate in tandem with one another to increase an energy yield from the energy recovery system.

BRIEF DESCRIPTION OF DRAWINGS

Reference is made to the accompanying drawings in which similar components are indicated using the same reference numbers, and in which.

DETAILED DESCRIPTION

Figure 1:
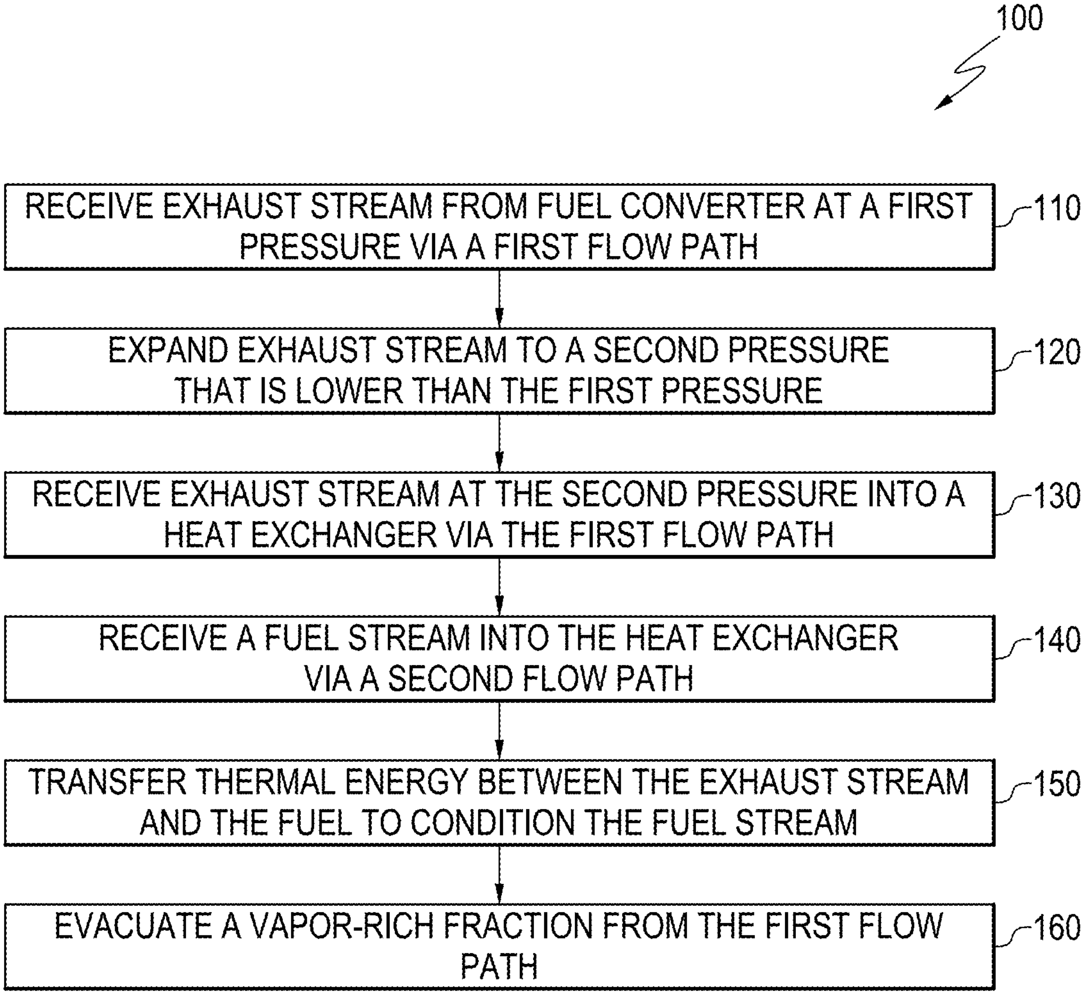
FIG. 1 is a flow diagram of a method in accordance with at least one aspect of the disclosure.

Various aspects of the present disclosure relate to conditioning a fuel. Various systems and methods disclosed herein involve fuel conditioning by changing a thermal energy of the fuel, or a stream thereof, for use with a fuel converter. The fuel may undergo a temperature or a phase change. For example, a liquid fuel may be conditioned by warming and/or vaporizing. The conditioned fuel may be subsequently consumed by the fuel converter, such as, for example, an engine or a prime mover, that converts the chemical energy of the fuel to another form of energy such as mechanical and/or electrical energy.

The fuel conditioning may be incorporated into an energy utilization scheme that yields changes and/or improvements in thermal efficiency during operation of the fuel converter. Thermal energy may be exchanged between the fuel and an exhaust stream produced by the fuel converter to condition the fuel for use with the fuel convertor. Various methods and systems described herein recover or recuperate at least a portion of the thermal energy required to condition the fuel from the exhaust stream produced by the fuel converter, thereby reducing any energy input requirements from external sources.

In one embodiment, the systems and the methods may utilize the thermal energy of fluid flows therein to optimize an energy yield, such as, for example, an energy outputted based on an energy input required to operate the fuel converter. The system may be an energy recovery system having a turbine configured to expand the exhaust stream of the fuel converter from a first pressure to a second pressure, a compressor for evacuating the exhaust stream at the second pressure from the energy recovery system, and a heat exchanger assembly for transferring heat from the exhaust stream at the second pressure to the fuel. The heat exchanger assembly may increase an energy yield from the energy recovery system. In particular, the heat exchanger assembly may reduce and/or eliminate the amount of liquid in the stream delivered to the compressor, thereby reducing the work required by the compressor to evacuate the exhaust stream.

Additionally, the compressor and the turbine may operate in tandem with one another. Thus, the energy recovery system may maximize a pressure difference across the turbine, thereby optimizing an amount of mechanical work extractable from the exhaust stream. The technical effects discussed herein may be most readily observed in implementations where exhaust streams or a component thereof may readily undergo phase changes and/or where the fuel is more efficiently consumed by the fuel converter after being conditioned.

As used herein, the term "vapor-rich" may refer to a fraction of a material or a stream thereof which is predominantly, or entirely, in a gaseous or vapor phase. Thus, a vapor-rich fraction may consist of only gaseous components or contain small amounts of condensed components, such as, for example, entrained liquids. Additionally, a vapor-rich fraction may include one or more chemical species. For example, a vapor-rich fraction of an exhaust stream associated with a hydrogen fuel cell may contain water vapor and/or nitrogen gas. As used herein, the term "condensable vapor" may refer to one or more components of a vapor or vapor-rich fraction which may undergo a phase change into a liquid based on the surrounding process environment. Thus, in the context of the exhaust stream associated with the hydrogen fuel cell discussed above, the nitrogen gas may not be considered a condensable vapor if the temperatures and/or pressures along the flow path for the exhaust stream would not allow for a condensation thereof.

These and other aspects of the systems and the methods disclosed herein may be practiced with transportation systems such as, for example, various systems associated with a rail vehicle and/or a consist of vehicles formed therewith. In various embodiments, the fuel converter may be associated with a transportation system. In one embodiment, a vehicle of a transportation system may support the fuel converter thereon to provide onboard power generation for tractive purposes, which may additionally include, or otherwise be couplable with, other vehicles. In one embodiment, the fuel converter may be responsible for producing power for the purpose of propulsion and/or to perform work for another use, such as generating electrical energy to be consumed by an auxiliary system of the transportation system. In other embodiments, the fuel converter may be stationary. However, at least some of these aspects may be practiced with other types of systems, such as, for example, stationary fuel converters for generating power.

Now referring to FIG. 1, a flow diagram of a method 100 is disclosed according to one aspect of the disclosure. The method may include receiving 110 an exhaust stream from a fuel converter at a first pressure via a first flow path, expanding 120 the exhaust stream to a second pressure that is lower than the first pressure, receiving 130 the exhaust stream at the second pressure into a heat exchanger, receiving 140 a fuel stream into the heat exchanger via a second flow path fluidically isolated from the first flow path, transferring 150 thermal energy between the exhaust stream and the fuel stream to condition the fuel stream, and evacuating 160 the exhaust stream from the first flow path. The pressure of the exhaust stream evacuated from the first flow path may be at a pressure greater than the second pressure. The method may further include controlling one or more of the flow of the exhaust stream or the expansion of the exhaust stream based on a fuel converter control parameter such as a torque demanded by a controller for operating the fuel converter.

As used herein, the term "pressure" is used in reference to an absolute pressure unless specifically defined otherwise. The first pressure may be a pressure in a range of about 1 bar to about 10 bar. The second pressure may be a pressure in a range of about 0.1 bar to about 0.5 bar. Additionally, the exhaust stream may exit the heat exchanger at a pressure substantially the same as, or slightly less than, the second pressure or a pressure at which the exhaust stream enters the heat exchanger. The transfer of thermal energy with respect to the exhaust stream may be a constant pressure process.

The temperature of the exhaust stream at the first pressure may be a temperature in a range of about 65° C. to about 1000° C., or in a range of 70° C. to about 300° C. In some embodiments, the temperature of the exhaust stream at the first pressure may be a temperature no greater than about 600° C., 500° C., 400° C., 300° C., 200° C., 150° C., 120° C., or 100° C. In certain embodiments, the method may optionally include controlling the flow of the exhaust stream and/or the expansion of the exhaust stream based on a fuel converter control parameter such as a torque demanded by a controller for operating the fuel converter.

The fuel stream may enter the heat exchanger as a fluid having a temperature lower than that of the exhaust stream received by the heat exchanger. The fuel stream may be in a gaseous and/or liquid state, such as a cryogenic liquid or a cryo-compressed gas, and the thermal energy transferred from the exhaust stream may prepare the fuel stream for use by the fuel converter. For example, the thermal energy of the exhaust stream at the second pressure may be greater than or equal to an amount of energy required to increase a temperature of the fuel stream or in the case of liquid fuels, vaporize a liquid fuel stream, which may be required for certain types of engines and/or fuels, such as hydrogen powered internal combustion engines and/or fuel cells. In one embodiment, the expanded exhaust stream may initially be passed through one or more auxiliary heat exchangers to reduce the amount of thermal energy exchanged with the fuel stream and/or reduce the thermal burden on the fuel stream for changing a physical state of the exhaust stream, such as through condensation as discussed below.

The exhaust stream may include one or more phases based on the thermal energy, pressure, and/or temperature thereof. For example, some or all components of the exhaust stream at the second pressure may exist in a vapor form upon being expanded, at least a portion of which may condense or undergo a phase change within the heat exchanger. The exhaust stream from the fuel converter at the first pressure may also include components in liquid form, such as, for example, liquid water. Thus, expanding the exhaust stream to the second pressure may be associated with recovering a heat of vaporization associated with at least one component of the exhaust stream at the first pressure.

The exhaust stream within the heat exchanger may include a vapor-rich fraction and a liquid-rich fraction and the exhaust stream evacuated from the first flow path may include the vapor-rich fraction. The vapor-rich fraction may be free of, or contain very small amounts of, any condensable vapors. For example, when the exhaust stream is from a hydrogen fuel converter, the vapor-rich fraction may contain less than 5% by weight of water based on the entire weight of vapor-rich fraction. In certain embodiments, evacuating the exhaust stream may include compressing the vapor-rich fraction of the exhaust stream at the second pressure to atmospheric pressure or near-atmospheric pressure. While selection may be done with reference to application specific parameters, a suitable pressure may be in a range of from about 0.9 atmospheres (atm) to about 1.1 atm.

Further to the above, the method may further include one or more of condensing the liquid-rich fraction or accumulating the liquid-rich fraction, or separating the vapor-rich fraction of the exhaust stream from the liquid-rich fraction of the exhaust stream. Additionally, the method may include evacuating the liquid-rich fraction of the exhaust stream from the first flow path. The liquid-rich fraction may be evacuated to an environment having a third pressure that is equal to or greater than the second pressure, which, in certain embodiments, may be accomplished by pumping the liquid-rich fraction into a third flow path. In certain embodiments, the liquid-rich fraction may include a majority of, or substantially all of, a condensable vapor of the exhaust stream received by the heat exchanger. For example, in the context of hydrogen fuel converters, the liquid-rich fraction in the heat exchanger may include at least 85% by weight of the entire amount of water in the exhaust stream received by the heat exchanger and the vapor-rich fraction may be substantially free of water.

Evacuating the exhaust stream as separate vapor-rich and liquid-rich fractions may decrease the amount of work required relative to a single evacuation. For example, the work required to pump liquid water, which was condensed from the exhaust stream received by the heat exchanger at subatmospheric pressure, back to atmospheric pressure may be significantly lower than simply compressing the exhaust stream back to atmospheric pressure, thereby minimizing losses in the overall energy yielded by the method. Collisions between liquid droplets and vanes of a compressor wheel or rotor may decrease a thermal efficiency of a compressor. Thus, minimizing the liquid and/or condensable vapor content to be compressed in the vapor-rich fraction may also minimize the likelihood of liquid formation during the compression, thereby facilitating operation of the compressor at a high thermal efficiency. Additionally, a liquid pump may provide a form of backflow prevention. Thus, utilization of a pump may decrease the likelihood of any backflow from the environment at the third pressure into the first flow path, thereby maintaining a thermal efficiency of the expansion of the exhaust stream.

Figure 2:
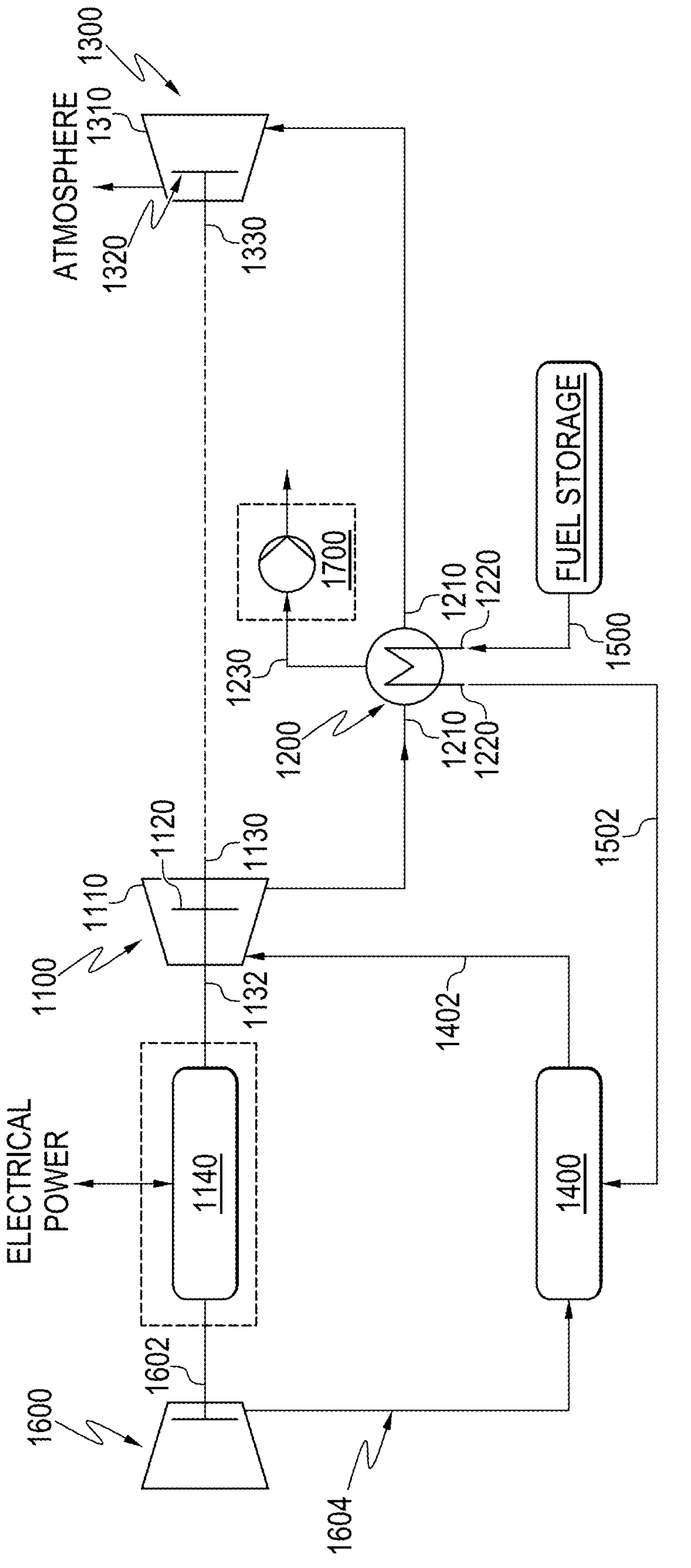
FIG. 2 is a schematic representation of a system in accordance with at least one aspect of the present disclosure.

Now referring to FIG. 2, a schematic representation of a system 1000 having a turbine 1100, a heat exchanger 1200, and a compressor 1300 is provided according to one embodiment of the present disclosure. The system may be configured to utilize and/or extract thermal energy from a fluid flow produced by a fuel converter, such as, for example, an exhaust stream 1402 of fuel converter 1400 as illustrated in FIG. 2. The fuel converter may include an internal combustion engine and/or a fuel cell. The fuel converter may also be configured to utilize fuel in a specific state. For example, the fuel converter may be configured to consume at least one of hydrogen gas or natural gas as gasified fuel 1502 derived from fuel 1500.

The turbine may be a turbine assembly including a turbine housing 1110 and a turbine rotor 1120. The turbine housing includes an inlet for receiving a fluid flow, such as the exhaust stream from the fuel converter, an outlet for expelling the fluid flow, and an internal flowpath therebetween including a volute and a cavity formed within the turbine housing. The turbine rotor is positioned within the cavity of the turbine housing and may rotate within the turbine housing about a turbine rotation axis.

The turbine rotor may include blades configured to interact with the expanding fluid flow, thereby causing the turbine rotor to rotate about the turbine axis. For example, thermal energy of an exhaust stream may be converted into rotational energy via an expansion of the exhaust stream at the turbine inlet through the turbine rotor. An aspect ratio of the turbine rotor may be determined based on rotor diameter and a rotor height extending along a rotation axis of the turbine rotor, which is colinear with the turbine rotation axis when mounted in the turbine housing. The relationship between the fluid flow and the rotation of the turbine rotor may be determined based on the aspect ratio, geometry of the blades, the orientation of the blades with respect to one another, and/or the orientation of the blades with respect the turbine rotation axis. In one embodiment, the geometry of the turbine may be variable geometry turbine. As such, the aspect ratio of the turbine may be varied according to operating conditions, thereby facilitating control of turbine dynamics in different turbine operating regimes due to changes in the fluid flow therethrough. Alternatively, or additionally, the internal flowpath may include a bypass mechanism, such as an internal or external wastegate, which may be actuated to fluidly connect the inlet and the outlet to selectively bypass the cavity, which may reduce the amount of interaction between the fluid flow.

Further to the above, the turbine includes a turbine shaft 1130 extending along the turbine rotation axis such that, when coupled to the turbine rotor, the turbine shaft and turbine rotor may rotate with one another. Torque transfer, and thus, rotational energy transfer, to and/or from the turbine rotor may be accomplished via the turbine shaft. Accordingly, thermal energy of the exhaust stream may be extracted by the turbine rotor as rotational energy and transferred through the turbine shaft as driving energy for use by another rotatable member.

The turbine rotor and a first end of the turbine shaft positioned within the turbine housing may be coupled by a reversible mechanical coupling or a non-contact coupling, such as, for example, a coupling based on magnetic and/or viscous interactions. Alternatively, the turbine shaft and the turbine rotor may be considered as permanently coupled in cases where the turbine shaft and the turbine rotor are coupled such that a significant amount of force would be required to separate the two from one another, such as, for example, a coupling relying on a bond, an engineered fit, a transition fit, an interference fit, a designed deformation, or any combination thereof. As discussed in greater detail herein, the turbine shaft may be a primary shaft couplable with the compressor. Additionally, the turbine may include a secondary turbine shaft 1132 extending along the turbine rotation axis in a direction opposite the primary turbine shaft.

The compressor may be a compressor assembly including a compressor housing 1310 and a compressor rotor 1320. The compressor housing includes an internal volume connecting an inlet and an outlet. The compressor rotor is positioned within the internal volume of the compressor housing and may rotate within the compressor housing about a compressor shaft 1330 defining a compressor rotation axis. The compressor rotor may be coupled with, or attached to, the compressor shaft. Thus, in one embodiment, the compressor and the turbine may be operated in tandem with one another. In some respects, operating the compressor rotor in conjunction with the turbine rotor may increase the range of pressure associated with the expansion across the turbine, thereby increasing the available amount of rotational energy extractable from the exhaust stream.

The compressor rotor may be operable by a rotational energy imparted onto the compressor shaft. For example, the compressor shaft may be mechanically coupled with, or incorporated into, the turbine shaft, thereby providing transfer of the driving energy extracted from the exhaust stream to the compressor rotor during operation. The rotational energy delivered via the compressor shaft may be added to a flow of fluid, such as an expanded exhaust stream from the turbine, through the compressor assembly, thereby resulting in a pressure gradient across the compressor assembly. The compressor rotor may maintain the fluid flow at the inlet of the compressor housing at a first pressure that is lower than a second pressure at the compressor housing outlet during operation.

The system may include an auxiliary power device 1140 coupled to the turbine for exchanging energy with the turbine rotor. The auxiliary power device may be a motor for converting electrical energy into rotational energy and/or a generator for converting rotational energy into electrical energy. The auxiliary power device may be electrically coupled to one or more electrical energy device or electrical storage device such as, for example, a battery. In some embodiments, the auxiliary power device may be mechanically coupled to the turbine via the secondary turbine shaft.

In one embodiment, the turbine may be incorporated into a turbocharger assembly, which may include a secondary compressor 1600 having a shaft 1602 operable by rotation of the secondary turbine shaft to compress an air intake 1604 stream of the fuel converter. In one embodiment, the shaft of the secondary compressor is mechanically coupled with, or incorporated into, the secondary turbine shaft. In another embodiment, the turbocharger assembly may be an e-turbo having an auxiliary power device for delivering and/or receiving rotational energy to the secondary turbine shaft and/or the shaft of the secondary compressor as illustrated in FIG. 2.

The heat exchanger may be positioned such that exhaust flow exiting the turbine is routed through the heat exchanger prior to reaching the compressor. However, in another embodiment, the system may include, in addition to the heat exchanger illustrated in FIG. 2, one or more auxiliary heat exchangers through which the exhaust stream may flow prior to heat exchanger illustrated in FIG. 2.

The heat exchanger may include a first flow channel 1210 for conveying fluid flow between the turbine and the compressor, a second flow channel 1220 for flowing a fuel, and a third flow channel 1230 in fluid communication with the first flow channel. The first flow channel and the second flow channel may be contained within a single unit, as depicted in FIG. 2 for example, to form a direct thermal interface such that thermal energy may be exchanged between fluid flows of the first and second channels through a physical boundary defined by one or more of the first flow channel or the second flow channel. In other implementations, however, transfer of thermal energy between respective fluid flows through the first flow channel and the second flow channel may be indirect. For example, a working fluid may be conveyed through a flow circuit as a thermal energy transfer medium in contact with both the first flow channel at a first portion of the flow circuit and, at a second portion of the flow circuit, the second flow channel. In embodiments where the system is implemented on a transportation system having a plurality of vehicles, the first portion of the flow circuit may be on a first vehicle and the second portion of the flow circuit may be on a second vehicle. Thus, the transfer of thermal energy may not be limited to occurring on a single vehicle.

The third flow channel may be configured to accumulate a liquid present in a fluid flow within the first channel via an inlet of the third flow channel. In some embodiments, the third flow channel may be vertically disposed such that no portion of the third flow channel is located above a lowermost portion of the first flow channel during operation of the system. The lowermost portion of the first flow channel may be a branch point from which the third flow channel extends such that any liquid in the vicinity of the branch point may flow into and/or collect in the third flow channel. In one embodiment, the third flow channel may downwardly extend away from the first flow channel. Alternatively, or additionally, the third flow channel may include an inline separation device such as a vapor-liquid separator and/or a bed of a sorbent material.

The system may include a pressure isolation component 1700. An inlet of the pressure isolation component may be in fluid communication with an outlet of the third flow channel and an outlet of the pressure isolation component may be in fluid communication with an environment having a pressure greater than or equal to the pressure of the third flow channel and/or the pressure of the first flow channel. The pressure isolation component may flow fluid therethrough in one direction without allowing flow in the opposite direction. For example, the pressure isolation component may be a check valve or a liquid pump. Thus, the pressure isolation component may facilitate evacuation of a liquid-rich fraction from the first flow path without any significant fluctuation in the pressure of the first flow path.

In one embodiment, the system may be an energy recovery system including the turbine, the compressor, and a heat exchanger assembly. The heat exchanger assembly includes the heat exchanger and a pump attached to the third flow channel. The turbine expands an exhaust stream of the fuel converter from a first pressure to a second pressure and the compressor evacuates the exhaust stream at the second pressure from the energy recovery system. Additionally, the compressor and the turbine operate in tandem with one another. Thus, the energy recovery system may optimize the amount of thermal energy extractable from the exhaust stream.

Further to the above, the heat exchanger assembly may increase an energy yield of the energy recovery system. In one embodiment, the heat exchanger assembly may deliver a dried fraction of the exhaust stream to the compressor. For example, the heat exchanger may exchange thermal energy with a fuel to condense any condensable component of the exhaust stream in the first flow channel into a liquid-rich fraction and accumulate the liquid-rich fraction in the third flow channel. The pump may displace and/or isolate the liquid fraction from the third flow channel into a separate environment to avoid entraining any liquid into the exhaust stream exiting the heat exchanger. Thus, the mechanical work required by the compressor to evacuate the exhaust stream via the compressor may be minimized.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the examples, including the best mode, and to enable a person of ordinary skill in the art to practice the examples, including making and using any devices or systems and performing any incorporated methods. The claims define the patentable scope of the disclosure and include other examples that occur to those of ordinary skill in the art. Such other examples are within the scope of the claims if they have structural elements that do not differ from the literal language of the claims, or if they include equivalent structural elements with insubstantial differences from the literal language of the claims.

What is claimed is:

1. A method, comprising:

receiving an exhaust stream from a fuel converter at a first pressure via a first flow path;

expanding the exhaust stream to a second pressure that is lower than the first pressure;

receiving the exhaust stream at the second pressure into a heat exchanger via the first flow path;

receiving a fuel stream into the heat exchanger via a second flow path, wherein the first flow path is fluidically isolated from the second flow path;

transferring thermal energy between the exhaust stream and the fuel to condition the fuel stream, the exhaust stream within the heat exchanger comprises a vapor-rich fraction and a liquid-rich fraction; and evacuating the vapor-rich fraction from the first flow path, with a pressure of the vapor-rich fraction evacuated from the first flow path being greater than the second pressure.

2. The method of claim 1, further comprising separating the vapor-rich fraction of the exhaust stream from the liquid-rich fraction of the exhaust stream, and at least one of condensing the liquid-rich fraction or accumulating the liquid-rich fraction.

3. The method of claim 1, further comprising evacuating the liquid-rich fraction from the first flow path to an environment having a third pressure that is equal to or greater than the second pressure.

4. The energy utilization method of claim 3, further comprising pumping the liquid-rich fraction from the first flow path into a third flow path.

5. The energy utilization method of claim 1, wherein the liquid-rich fraction is a water rich fraction.

6. The energy utilization method of claim 1, wherein transferring the thermal energy from the exhaust stream at the second pressure vaporizes the fuel stream.

7. The energy utilization method of claim 1, further comprising feeding the conditioned fuel stream to the fuel converter.

8. The energy utilization method of claim 1, wherein the fuel stream is a cryogenic liquid prior to conditioning.

9. A system, comprising:

a turbine assembly, comprising:

a turbine housing configured to accept an exhaust stream generated by a fuel converter; and a turbine rotor configured to extract a driving energy from the exhaust stream based on an expansion of the exhaust stream through the turbine assembly;

a heat exchanger, comprising:

a first flow channel for accepting the exhaust stream from the turbine assembly;

a second flow channel for flowing a fuel for the fuel converter, and the second flow channel is in thermal communication with the first flow channel; and a third flow channel in fluid communication with the first flow channel, and the third flow channel is configured to accumulate a condensable component of the exhaust stream; and a compressor assembly, comprising:

a compressor housing for accepting the exhaust stream from the first flow channel; and a compressor rotor operable by the driving energy.

10. The system of claim 9, further comprising a pressure isolating component, and an inlet of the pressure isolating component is in fluid communication with the third flow channel.

11. The system of claim 9, wherein the fuel converter is configured to be supported on a vehicle during use.

12. The system of claim 9, further comprising a shaft coupling the turbine rotor and the compressor rotor.

13. The system of claim 9, further comprising a motor mounted on a shaft coupled to the turbine rotor.

14. The system of claim 9, wherein the fuel converter is an internal combustion engine or a fuel cell.

15. The system of claim 14, wherein the fuel converter is configured to consume at least one of hydrogen gas or natural gas.

16. The system of claim 9, wherein the turbine assembly comprises at least one of a variable turbine wheel or a turbine bypass valve.

17. A turbocharger system comprising the system of claim 9.

18. An energy recovery system for a fuel converter, the energy recovery system comprising:

a turbine configured to expand an exhaust stream of the fuel converter from a first pressure to a second pressure;

a compressor for evacuating the exhaust stream at the second pressure from the energy recovery system, wherein the compressor and the turbine are configured to operate in tandem with one another; and a heat exchanger assembly for transferring thermal energy from the exhaust stream at the second pressure to a fuel for the fuel converter, wherein the heat exchanger assembly is configured to increase an energy yield from the energy recovery system.

19. The energy recovery system of claim 18, wherein the heat exchanger assembly is configured to provide a dried fraction of the exhaust stream to the compressor.

20. The energy recovery system of claim 19, wherein the heat exchanger assembly is configured to isolate a condensable component from the exhaust stream at the second pressure to produce the dried fraction of the exhaust stream.

* * * * *